… #

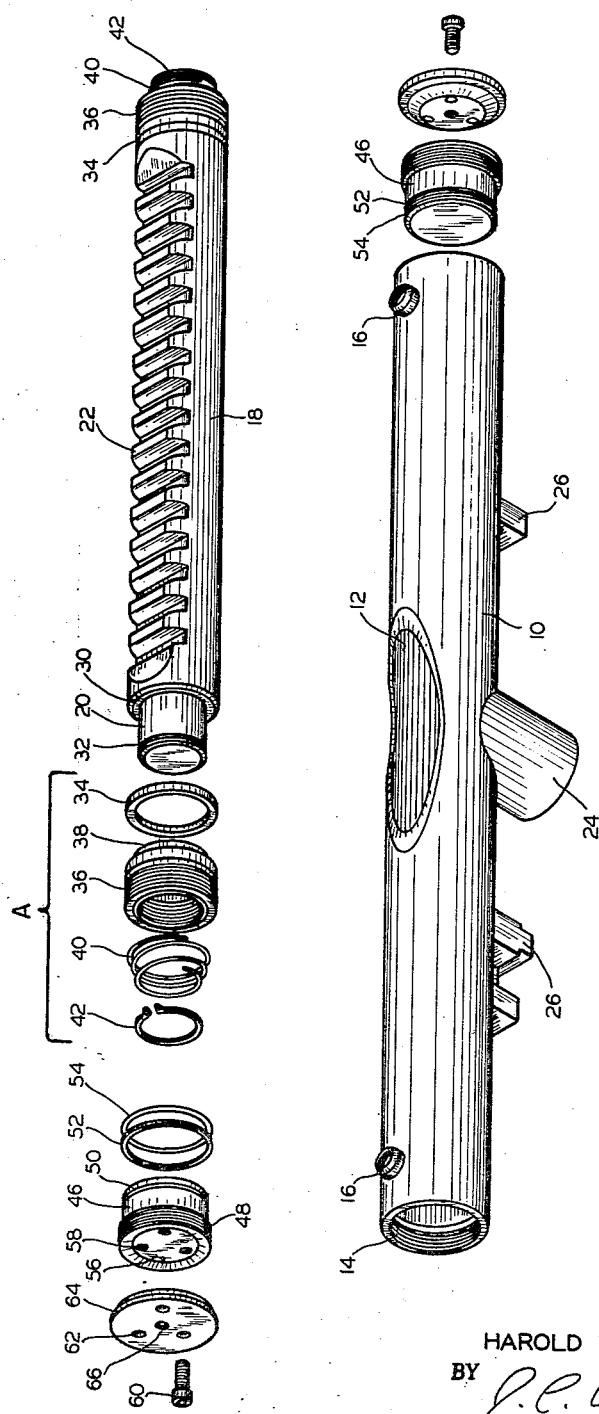
INVENTOR
HAROLD W. PENNINGTON
ATTORNEY

3,130,646
ADJUSTABLE CYLINDER END STOP
Harold W. Pennington, Battle Creek, Mich., assignor to Clark Equipment Company, a corporation of Michigan
Filed Mar. 12, 1962, Ser. No. 179,064
7 Claims. (Cl. 92—13)

This invention relates to hydraulic cylinder construction, and more particularly to adjustable cylinder end stop construction for cylinders.

It is a primary object of the invention to provide in cylinders of the type contemplated an improved adjustable end stop construction.

Another object of the invention is to provide in cylinders or tubes of the type contemplated an end stop construction which is adjustable without removing any parts from the cylinder.

It is a feature of the invention to provide in cylinder end stop constructions, means for observing the position of the end stop and the amount of adjustment available in either direction.

Other objects, features and advantages of the invention will appear from the following description taken in conjunction with the drawing wherein the single figure illustrates in perspective and exploded view a hydraulic cylinder construction adapted to receive a reciprocable free piston-rack construction with which my novel cylinder end stop construction is combined.

Referring now in detail to the drawing, a hydraulic cylinder 10 is illustrated which provides an oval opening 12 in the wall thereof and opposite internally threaded ends, one of which is shown at numeral 14. Adjacent opposite ends of the cylinder is provided a pair of hydraulic fittings 16 adapted to receive conduits for supplying and venting pressure fluid to and from pressure chambers formed in the opposite end portions of the cylinder. A free piston-rack 18 having reduced ends 20 is adapted to be received within cylinder 10, and when so received is actuatable in either direction upon the introduction of pressure fluid in one or the other of fittings 16. The rack teeth 22 which are formed in one side of piston 18 are located beneath oval opening 12 in the cylinder wall such that actuation of the rack is capable of driving a pinion gear, for example, mounted immediately above opening 12, the teeth of which extend through the opening into engagement with teeth 22. A back-up bearing 24 also extends through an opening, not shown, in the side of the cylinder wall opposite opening 12 and engages the side of piston 18 opposite from teeth 22 for supporting the piston and minimizing deflection thereof during operation. Cylinder mounting brackets are illustrated at numeral 26. The mounting of the cylinder and piston construction briefly described above is disclosed in detail in copending application Ser. No. 170,879, filed February 5, 1962, in the name of William A. Norlander (common assignee).

The assembly of parts bracketed by the letter "A" is adapted to be received on each reduced diameter end 20 of piston 18. These parts are shown in exploded relation adjacent the left-hand end of the piston and in assembled relation on the reduced diameter end of the right-hand end of the piston. Each end 20 provides a shoulder 30 and a circumferential groove 32. A cylinder wall wiper ring 34 is received upon end 20 and abuts shoulder 30. A packing assembly 36 having a reduced diameter end 38 receivable within the opening of wiper ring 34 is also located on end 20. A compression spring 40 is next placed on end 20 and compresses packing 36 a predetermined amount, whereupon snap ring 42 is located in groove 32, which holds the foregoing assembly A in position on each piston end 20. When the piston is completely assembled it may be inserted in either end of cylinder 10 in a predetermined position on bearing 24 with teeth 22 located beneath opening 12 as explained above.

The cylinder end stop construction of my invention comprises a cylinder end gland member 46 having outer circumferential threads 48 formed in the one end thereof which are adapted to threadedly and adjustably engage threads 14 at each end of cylinder 10. A circumferential groove 50 is located adjacent the opposite end of gland 46 for receiving a back-up ring 52 and resilient O-ring 54. Radially inwardly of the threaded end 48 of gland 46 is a recessed portion 56 in which are located three circumferentially spaced and threaded openings 58. Each of these openings is adapted to threadedly receive a bolt 60 which passes through one of the openings 62 in a circular end cap 64, openings 62 being located in end cap 64 so that they align with openings 58 in the gland. End cap 64 is at least as large in diameter as cylinder 10 so that the outer peripheral portion of the end cap overlaps the adjacent end wall of the cylinder when the end stop construction is assembled in the cylinder. O-ring 54, of course, engages the wall of cylinder 10 to prevent leakage through gland 46. A central opening 66 is also provided in end cap 64 for a purpose to be described.

With the O-ring and back-up ring in groove 50, gland 46 is inserted in the one end of cylinder 10 and adjusted to a desired position by means of threads 48 and 14. End cap 64 is then located over the said end of the cylinder and bolts 60 inserted through openings 62 to engage openings 58, whereupon the bolts may be tightened to hold end cap 64 in rigid abutment with the end of the cylinder wall and to draw gland 46 into rigid holding relation as between threads 48 and 14. It will be appreciated that such tightening of bolts 60 both forces end cap 64 tightly into the end wall of the cylinder while tending to back off gland 46 a slight amount until adjacent sides of threads 48 and 14 are in tight abutment with each other. Such tight abutment between the threads tends to seal pressure fluid from leakage through the gland, along with O-ring 54. Each cylinder end stop assembly is, of course, independently adjustable and thereby controls the stroke of piston 18 in cylinder 10. Inasmuch as the cylinder and piston construction of the present invention is normally used in pairs on opposite sides of a pinion engaged by the teeth of the free piston, as described in detail in the aforementioned copending application, it will be appreciated that the available independent adjustment of the end stop construction at the ends of both said cylinders are adjustable in a sufficiently precise manner so that the pistons in both cylinders will contact their respective stops simultaneously, thus dividing shock loading equally between the two. Also, it will be appreciated that the shock loading which results from impact engagement of the piston with the end stop is distributed over a relatively large area of material in that the engagement threads 14 and 48 are located at the full diameter of the cylinder.

One of the primary objects of this invention is to facilitate adjustment of the cylinder end stop construction, and also inspection thereof, without exposing the adjacent oil cavity of the cylinder. This important objective is achieved by means of my novel end stop construction in a relatively simple and highly effective manner. It will be observed that with gland 46 in position such that threads 14 and 48 are engaged, that precise adjustment of the end stop is important in order to effect proper stroke of the piston 18 and the equal distribution of shock loading, as mentioned above, when such cylinder constructions are used in pairs. In order to make an adjustment following such assembly of the gland 46 and end cap 64 it is merely necessary to loosen bolts 60 any desired amount and then turn the entire end stop assembly, including gland 46 and end cap 64, in or out of the cylinder to the desired position, whereupon bolts 60 are again tightened to effect rigid engagement of the end cap with the cylinder and the threads 48 with threads 14. The assembly may be turned for adjustment, for example, by inserting a screw driver or other simple tool between the heads of bolts 60 and using the tool as a lever to actuate the gland in or out relative to threads 14. With adjustment of gland 46, end cap 64, of course, rotates but is not actuated relative to the cylinder wall inasmuch as it is in continuous engagement with the end of the cylinder wall. Opening 66 is provided to receive, for example, a feeler gauge which may be utilized to measure the depth of threads 14 between the inner surface of end cap 64 and the outer end of threads 48, which provides a precise method of determining the exact position of adjustment of gland 46 in the cylinder. The same means of adjustment may, of course, also be used upon initial assembly of the end cap assemblies in the cylinder ends. If desired, opening 66 may be threaded, which will then provide a convenient means for connecting a protective cylinder cover or shield over the ends of the cylinder.

Although only one embodiment of my invention has been illustrated and described in detail, it will be apparent to those skilled that modifications in the structure and relative arrangement of parts may be made without necessarily departing from the scope of the invention.

I claim:

1. A cylinder-piston construction comprising an internally threaded cylinder wall at at least one end of the cylinder, and an adjustable piston stop assembly including an externally threaded cylinder gland threadedly engageable with the threaded end of the cylinder and adjustable to a desired position wholly within said cylinder to provide stop means for the piston, an end cap overlapping the threaded end of the cylinder wall, a plurality of alignable openings in the gland and cap, and securing means registrable with said aligned openings in both the gland and cap for holding the threads of the gland in rigid abutment with the threads of the cylinder and the cap in rigid abutment with the end wall of the cylinder.

2. A cylinder-piston construction as claimed in claim 1 wherein said openings in said gland and said securing means are threadedly engageable to effect a tightening of the gland in a selected adjusted position outwardly against the threads of the cylinder wall while effecting a tightening of the cap inwardly in overlapping relation to the end of the cylinder wall.

3. A cylinder-piston construction as claimed in claim 1 plus an additional opening in said cap providing access to the cylinder space between the cap and gland for observing or measuring the adjusted position of the gland relative to the end of the cylinder wall.

4. A cylinder-piston construction as claimed in claim 1 wherein circular sealing means is mounted on said gland providing a seal with the cylinder wall.

5. A cylinder-piston construction as claimed in claim 1 wherein the other end of said cylinder is also provided with internal threads for engaging a second and similar piston stop assembly, both of said piston stop assemblies being adjustable axially inwardly or outwardly of the cylinder, and a reciprocable piston member in said cylinder actuatable under hydraulic pressure in either direction into abutment with one or the other of said piston stop assemblies, the adjusted axial position of each said piston stop assembly controlling the stroke in either direction of said piston member.

6. A cylinder-piston construction comprising an end stop assembly locatable in fixed adjusted position within at least one end portion of the cylinder, said end stop assembly including a stop member movable axially inwardly and outwardly of the end portion of said cylinder, a cap member overlapping the end wall portion of said cylinder, and securing means connecting said cap portion to said stop member such that said stop member tends to be actuated axially outwardly of said cylinder in rigid abutment with a portion of the cylinder wall and said cap member tends to be actuated axially inwardly of said cylinder in rigid and overlapping abutment with the cylinder end wall, a loosening of said securing means following assembly being effective to permit adjustment of said stop means by rotation of the stop means and cap member, said securing means being actuated to effect rigid abutment of said stop means and cap member relative to said cylinder following such adjustment.

7. A construction as claimed in claim 6 wherein an opening is provided in said cap member for observing or measuring the space between the end stop member and the cap member to determine the adjusted position of the stop member within the cylinder.

References Cited in the file of this patent

UNITED STATES PATENTS

| | | |
|---|---|---|
| 2,443,312 | Geiger et al. | June 15, 1948 |
| 2,583,499 | Teegen | Jan. 22, 1952 |
| 2,605,748 | Rasoletti | Aug. 5, 1952 |
| 2,865,693 | Barnhart | Dec. 23, 1958 |